Patented Oct. 21, 1924.

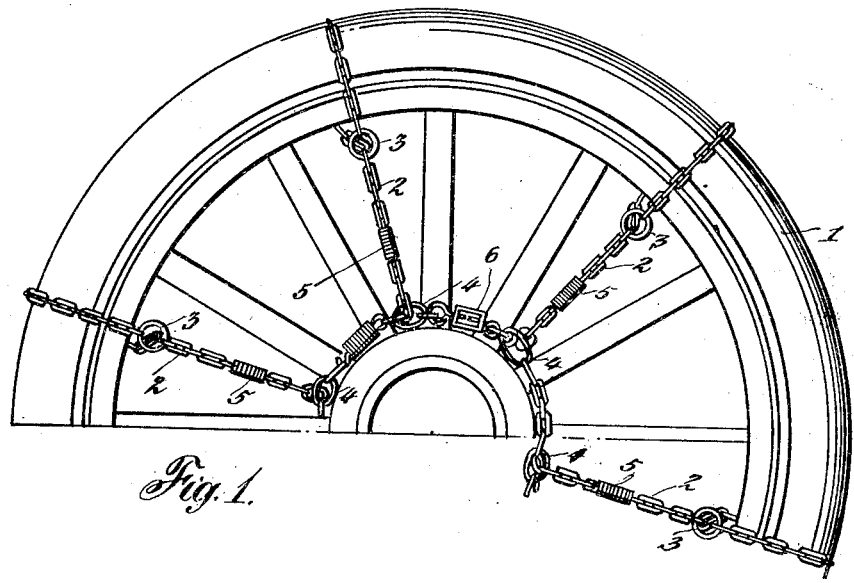

1,512,529

UNITED STATES PATENT OFFICE.

JONATHAN O. FOWLER, OF NEW YORK, N. Y.

ANTISKID DEVICE.

Application filed October 12, 1920. Serial No. 416,560.

*To all whom it may concern:*

Be it known that I, JONATHAN O. FOWLER, a citizen of the United States, and resident of New York, in the county of New York and State of New York, have invented a certain new and useful Antiskid Device, of which the following is a specification, the same being a full, clear, and exact description of the invention, such as will enable others skilled in the art to which it appertains to make and use the same.

The invention is designed to provide a non-skidding device which is quickly attached to the tire and which consists of individual chains or their equivalents which are arranged to embrace the tire. These individual chains equalize the strain on the wheel, and if one of the chains becomes broken there is no liability of the whole device being removed from the wheel or flying from the same.

One object of the invention is to produce an improved and simplified anti-skidding device, particularly adapted for use in connection with motor trucks and the like, and which may be easily and quickly applied to or removed from the tire.

Another object of the invention is to provide a new and improved antiskid device which will be inexpensive in cost of manufacture, very simple and durable, and most reliable in its operation.

To attain the desired object, and other objects hereinafter set forth, the invention consists in the construction, arrangement and operation of parts hereinafter more fully set forth and shown in the drawings, illustrative of one embodiment of the invention, which accompany and form a part of this specification and in which Figure 1 represents a partial elevation of a tire equipped with my invention;

Figure 2 is a detail of one of my chain sections or units;

Figure 3 is a plan view of my take-up device; and

Figure 4 is a perspective and Figure 5 a plan view of my guard clasp.

In the preferred form of the invention I use chain sections or units 2, each chain being adapted to pass around or embrace the tire 1, and having a ring 3 at one end through which the other end of the chain is adapted to pass so that a loop is formed.

The said other and free ends, which are passed through the fastening or connecting devices comprising the rings 3, are also provided with connecting rings 4 which, as hereinafter explained, also may be made with fastening devices, as guard clasps 7 or 8 by which adjacent chains may be attached thereto. Each chain length may comprise merely the body portion and end rings or links, as stated, or a resilient device, as a spring 5, may be inserted in either, or both, the loop or radial portion and also the floating or retaining ring or circumferential portion of a chain length at will, and the part of a length serving as a part of the central or floating ring may include a take-up device as a turn-buckle 6 if desired so as to regulate the diameter of the said central ring.

Each of these chains extends individually from a location intermediate the hub of the wheel and the tire, where it is fastened to a rear chain length, and is wound around the tire, and it also extends circumferentially from said location and is connected with adjacent forward chain lengths to that if one of them breaks, the remaining chains remain seated where they are and the device still stays in working order on the wheel.

In the example of the invention presented the end of the longer portion of the oblong ring 4 of each chain is passed through the ring 3 so as to constitute a loop encircling and enclosing the tire, after which the oblong ring 4 of an adjacent chain section is passed lengthwise over the ring 4 and central portion of the first named chain, thus permitting the inner portion of the first named chain to assume a circumferential position and to serve as a retaining means for the said adjacent chain, which series of circumferential sections of the various chains, as an entirety comprises, as it were, a floating ring passing around the hub of the wheel.

The said loops and floating or retaining ring are so relatively positioned that in contracting the said ring the tread portions of the loops, or rather running nooses, are drawn somewhat toward the hub in approximately radial directions whereby the size of the running nooses may be increased or diminished accordingly as the diameter of the retaining ring is increased or diminished. I thus employ nooses formed by loosely running the several chain lengths through rings to encircle the tire in such a manner that the said self-adjusting or running nooses will be able to move or creep backward and forward to some extent on the tire thus preventing the wear from coming on one place.

This creeping movement is strengthened by the radial extensions of the chain lengths which sway back and forth as the wheel rotates, the floating ring around and adjacent to the hub serving to hold the various parts in proper position, the rings 4 serving to grasp an adjacent chain at the angle of its radial and circumferential extensions.

In order that a ring 4 may be passed through the other ring 3 the said rings are preferably made of suitable shape and the rings 3 may also be made of such size that, in order to pass the chain through them, the ends of the longer portions of the rings will readily enter lengthwise the relatively larger opening of the ring 3. By this arrangement, the links of the chain when in operative position will abut the edges of the rings and so may, if desired, be thereby releasably held in place without danger of slipping.

If desired, yet another means to prevent any slipping of said rings when in adjusted position on the tire may be used, as guard clasps 7 or 8 made with movable holding devices, illustrated as attached to the rings 4 herein, as follows:

The spring clasp 7 opens by bending inwardly or turning on its pivot 7' supported by the clasp 7² secured to the ring 4. The clasp 8 comprises a spring wire wound at 8' around a ring 4 and may be bent aside to allow another ring 4 to be passed by the said wire. Other releasable fastening devices may obviously be used in my invention and substituted for the ones shown and described.

The similar chain elements are preferably made of practically equal lengths, which simple chain sections or units are so fastened that certain corresponding inner portions thereof extending substantially at right angles to a radius of the wheel form a practically circular and concentric ring at one side of and exterior of, and of less diameter than, the wheel, and other corresponding parts as outer portions thereof form attached noose portions to encircle the tire, the latter parts of the chains extending approximately radially from the said concentric retaining ring. Each chain element is also detachably attached by the fastening device at its inner end to the next adjacent chain intermediate of the ends thereof, which said fastening devices may comprise any suitable and desired attaching means, whereby in case any loop becomes worn out and falls from the tire, the remaining loops and the retaining ring will not become detached. The tautness of the loops, sometimes self-regulating as by the use of the rings 3 and 4, is not great enough for the chain to cut into the tire, as a certain freedom of movement of the retaining ring, and therefore of the various loops, may be secured by regulating the tension of the said ring by the use therewith of the take-up device 6.

The adjustability of my chain device permits it to be used with wheels of different sizes, whereby it will not be necessary to construct a separate chain length for each size of wheel, thereby saving the necessity of carrying in stock a large number of sets of different lengths of chains.

I desire to have it understood that I do not desire to be limited to the particular use or the exact details of construction shown and described, for obvious modifications will occur to persons skilled in the art.

What I claim as my invention is:—

1. In an antiskidding device for tires, a chain length comprising a series of links and a ring at each end, one ring being passed through the other to form a loop to encircle the tire, a plurality of other chain lengths similar to the one described, and each chain serving to constitute retaining means for an adjacent one.

2. In an antiskidding device for tires a chain length comprising a series of links and a ring at each end, one ring being passed through the other to form a loop to encircle the tire, a plurality of other chain lengths similar to the one described, and each chain length serving to constitute retaining means for an adjacent one, and a take-up device incorporated in one of the chain lengths.

3. In an antiskidding device for tires, a chain length comprising a series of links and attaching means at each end, the chain length being adapted to form a self-adjusting loop to encircle the tire, a plurality of other chain lengths similar to the one described, and the free end of each chain length serving to constitute retaining means for an adjacent one.

4. The combination with a vehicle wheel, of an antiskid device therefor comprising a series of chain sections or units, each having a portion adapted to form a loop to encircle the tire, the inner portions of said sections being connected to form a retaining ring of less diameter than the wheel, comprising the inner or free end of each section engaged with an adjacent section intermediate of its ends.

5. The combination with a vehicle wheel, of an antiskid device therefor comprising a series of sections, each having an outer portion adapted to form a loop to encircle the tire, the inner portions of said sections being connected to form a retaining ring of less diameter than the wheel, comprising the inner or free end of each section engaged with an adjacent section intermediate of its ends, and a take-up device incorporated in the said retaining ring.

6. The combination with a vehicle wheel, of an antiskid device therefor comprising a series of sections, each having a portion adapted to form a loop to encircle the tire, the other portions of said sections being attached by connecting means to form a retaining ring of less diameter than the wheel, the said connecting means comprising releasable fastening devices located at the inner end of each section and adapted to engage an adjacent section intermediate of its ends.

7. In an antiskidding device for tires, a tire chain comprising a series of links and a ring at each end, one ring being passed through the other to form a loop to encircle the tire, a plurality of other chains similar to the one described and each chain serving to constitute retaining means for an adjacent one intermediate of its ends.

8. In an antiskidding device for vehicle wheels, a tire chain comprising a series of links and connecting means at each end, one part of the chain being attached by one connecting means to another part thereof to form a self-adjusting loop to encircle the tire, a plurality of other chains similar to the one described, and the other connecting means of each chain serving to be engaged with an adjacent chain and to hold the latter in a detachably attached relation, the various inner portions of the chains forming a ring around and adjacent to the hub.

9. In an antiskidding device for tires, a tire chain comprising a series of links and a ring at each end, a locking device carried by one ring, the other ring being passed over the first named ring to form a loop to encircle the tire, a plurality of other chains similar to the one described, and each chain serving to constitute retaining means for an adjacent chain and to be fastened to the same by the said locking device.

10. In a device of the class described, a series of chain units each of which individually forms a self adjusting noose to encircle the tire, and parts of which collectively co-operate to form a chain ring between the hub of the wheel and the tire.

11. In a device of the class described, a chain having a ring and a tread portion and adapted to pass freely a predetermined distance through the ring to form a running noose, and a fastening device to prevent undue continuance of said movement, whereby the chain will not fall from the wheel in the event of the tread portion of the chain becoming worn through, a plurality of other chains similar to the one described and each chain serving to constitute retaining means for an adjacent one.

12. In a device of the class described, a plurality of detachable chain sections for vehicle wheels having tread portions and each adapted to form a loop around the tire and then extending inwardly in a radial direction toward the hub, the inner ends of the several chain sections being connected and turned circumferentially to collectively form a ring around and adjacent to the hub, whereby the said radial portions will loosely hold the loops to the tire in operative position, and whereby upon one of the chain sections becoming worn through at its tread portion it will not release the adjacent chain section but will be retained in position to permit a new chain section to be substituted for the worn one.

13. In a device of the class described, a chain having a ring at one end to co-operate with the chain to form a self adjusting noose to encircle the tire, another adjacent chain, the first named chain also having at its other end attaching means to secure the chain to the adjacent one intermediate of its ends.

14. In a device of the class described, a series of chain lengths each adapted to have the outer portion thereof looped around the tire, the central part of the length extending substantially radially toward the hub of the wheel and then being bent at an angle so that the inner part comprising the free end of the chain will lie in a substantially circumferential position, each length being connected at said angle with a free end of an adjacent chain.

15. In a device of the class described, a series of chain lengths each adapted to have the outer portion thereof looped around the tire, the central part of the length extending substantially radially toward the hub of the wheel and then being bent at an angle so that the inner part comprising the free end of the chain will lie in a substantially circumferential position, each length being connected at said angle with a free end of an adjacent chain, and having attaching means at each end thereof.

16. In a device of the class described, a series of chain lengths each adapted to have the outer portion thereof looped around the tire, the central part of the length extending substantially radially toward the hub of the wheel and then being bent at an angle so that the inner part comprising the free end of the chain will lie in a substantially circumferential position, each length being connected at said angle with a free end of an adjacent chain and having attaching means at each end thereof, the said attaching means comprising releasable securing devices.

17. In a device of the class described, a series of chain lengths each adapted to be looped around the tire of a wheel and to extend inwardly in an approximately radial direction to engage a chain length at one side of the same, and then to extend at an angle therefrom to engage a chain length at the other side thereof.

18. A device of the class described comprising a series of chain lengths with fastening devices connected thereto, said lengths being assembled on a wheel so that certain corresponding parts thereof form self adjusting means to encircle the tire and other corresponding parts thereof which are fastened to adjacent lengths form a ring around the hub of the wheel.

19. In a device of the class described, a series of chain lengths each adapted to have the outer portion thereof looped around the tire, the central part of the length extending substantially radially toward the hub of the wheel and then being bent at an angle so that the inner part comprising the free end of the chain will engage a chain forward of the same and will lie in a substantially circumferential position, each length being connected at said angle with a free end of a rearward chain and having attaching means at each end thereof.

20. In a device of the class described, a series of chain units each of which individually forms a loop to encircle the tire, and parts of which collectively co-operate to form a chain ring between the hub of the wheel and the tire, the said loops and ring being so relatively positioned that by contracting the said ring the tread portions of the loops are drawn toward the hub in approximately radial directions.

21. An antiskidding device for a vehicle wheel comprising a series of chain lengths, each chain length having one end attached to the same to form a loop to encircle the tire and then lying in a substantial radial direction to approach the hub and connected intermediate of its remaining part to another chain length rearward of the same, the inner end of the first named chain length being connected to a chain length forward of the same so as to be held in a practically circular direction, the assembled circular chain portions of the various chain lengths serving to form a retaining ring for said loops adjacent to and passing around the hub of the wheel.

22. An antiskidding device for a vehicle wheel comprising a series of chain lengths, each chain length having one end attached to the same to form a loop to encircle the tire and then lying in a substantial radial direction to approach the hub and then bent at an angle circumferentially, each chain length being connected at the said angle with a length rearward of the same and the extreme inner end of each chain length being connected with a forwardly lying length between its loop and inner end.

Signed at New York in the county of New York and State of New York this 11th day of October A. D. 1920.

JONATHAN O. FOWLER.